C. ALLEN.
Copy-Slip for Teaching Penmanship.

No. 161,192.  Patented March 23, 1875.

Witnesses:
Michael Ryan
Fred. Haynes

Campbell Allen
by his Attorneys
Brown & Allen

THE GRAPHIC CO.PHOTO-LITH.39 & 41 PARK PLACE,N.Y.

UNITED STATES PATENT OFFICE.

CAMPBELL ALLEN, OF ALBANY, NEW YORK.

IMPROVEMENT IN COPY-SLIPS FOR TEACHING PENMANSHIP.

Specification forming part of Letters Patent No. 161,192, dated March 23, 1875; application filed August 26, 1874.

*To all whom it may concern:*

Be it known that I, CAMPBELL ALLEN, of Albany, in the county of Albany and State of New York, have invented an Improvement in Copy-Slips for Teaching Penmanship, of which the following is a specification:

The first point in teaching penmanship is to impress upon the mind of the pupil an accurate idea of the proportions, curve, and slope of the letters or elements of letters to be imitated. It is found in practice that, with the exception of a few especially gifted in this regard, beginners in writing are unable to distinguish slight and even very considerable differences between the copy and their attempted imitation thereof, and thus the pupil continues to repeat, and often constantly increases, the same imperfection, thereby confusing more and more his mental image of what he is seeking to imitate. This difficulty has heretofore been effectually met only by that direct constant personal attention and criticism of the instructor of the individual pupil which is possible only to those favored by private individual instruction, and cannot be given to the members of large classes in public schools, or when the pupil is practicing by himself.

The object of my invention is to provide a means whereby the pupil learning to write may be enabled to criticise perfectly his own work, and whereby he may see without assistance from the teacher exactly in what points he has failed to imitate the copy.

My invention consists in a copy-slip of transparent material, upon which is the copy to be imitated, said copy-slip being preferably provided with a slightly-raised frame or border, whereby the pupil, placing the copy-slip directly over his imitation of the copy, may be enabled to detect even the minutest defect, the slightly-raised border or frame preventing contact between the copy-slip and the paper upon which the imitation is written, thus preventing the blotting of either slip or paper.

The following is a description of my invention, reference being had to the accompanying drawing, in which similar letters of reference indicate corresponding parts in the several figures.

Figure 1:
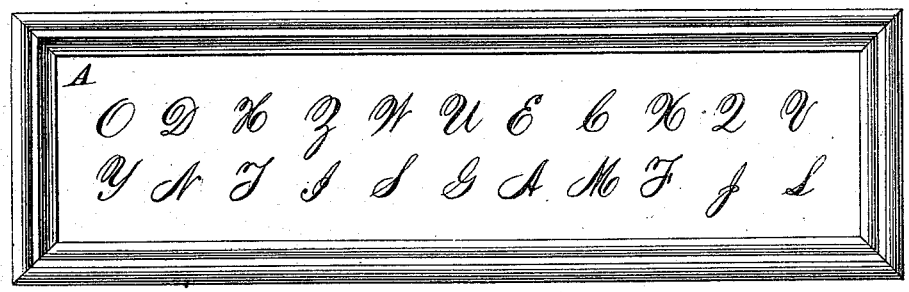
Figure 2:
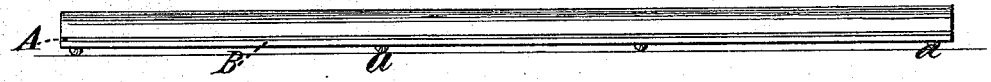
Figure 3:

Figure 1 is a plan view; Fig. 2, an edge view; Fig. 3, a transverse sectional view.

A is a thin sheet of any suitable transparent material, preferably of sheet-gelatine, varnished after the letters or elements of letters constituting the copy have been placed upon it. B is the slightly-raised frame or border of wood, pasteboard, or any other suitable and convenient material, along and around the edge of the copy-slip. This border may be continuous, or may consist of projections or bosses *a a* at suitable intervals.

The improved copy-slip is used as follows: The pupil first seeks to imitate the particular letter or element of a letter to which his efforts are directed, and then, by placing the copy-slip in the proper position over his imitation—which, by means of the raised border, he can do without waiting for the ink to dry—is thus enabled to see through the transparent material exactly wherein his imitation differs from the copy. The frame or raised border B serves not only to prevent blotting, but also to extend, protect, and render rigid the slip, and to facilitate handling it.

I claim—

A transparent copy-slip, combined with a frame or border, substantially as herein described.

CAMPBELL ALLEN.

Witnesses:
  MICHAEL RYAN,
  BENJAMIN W. HOFFMAN.